(12) United States Patent
Nakamura et al.

(10) Patent No.: US 7,225,792 B2
(45) Date of Patent: Jun. 5, 2007

(54) VALVE DEVICE FOR INTERNAL COMBUSTION ENGINE

(75) Inventors: Takuji Nakamura, Kariya (JP); Hiroshi Tanimura, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/315,137

(22) Filed: Dec. 23, 2005

(65) Prior Publication Data

US 2006/0137650 A1  Jun. 29, 2006

(30) Foreign Application Priority Data

Dec. 24, 2004 (JP) .............................. 2004-372617

(51) Int. Cl.
  *F02D 9/10* (2006.01)
(52) U.S. Cl. ........................ 123/337; 123/336
(58) Field of Classification Search ............. 123/336, 123/337, 399, 403; 29/890.12, 890.127; 251/304, 305, 307
See application file for complete search history.

(56) References Cited

U.S. PATENT DOCUMENTS 6,626,421 B2 *  9/2003  Torii et al. .................. 251/305

7,063,303 B2 *  6/2006  Makino et al. ............. 251/214

FOREIGN PATENT DOCUMENTS

JP  4-27131  3/1992
JP  2002-4893  1/2002

OTHER PUBLICATIONS

EPO Examination Report dated Dec. 15, 2006.

* cited by examiner

*Primary Examiner*—Stephen K. Cronin
*Assistant Examiner*—Johnny H. Hoang
(74) *Attorney, Agent, or Firm*—Nixon & Vanderhye PC

(57) ABSTRACT

A valve device for an internal combustion engine is provided with two flange portions, each of which is arranged at the outer periphery of a valve and has a larger outer diameter than a shaft. Annular valve-side end surfaces of the flange portions obstruct water flowing toward bearings and the inner surface of a cylindrical portion of a house along the surface of the shaft. Thus, water can be restricted from flowing into annular gaps between the shaft and the housing and annular gaps between the shaft and bearing members. Accordingly, water is not frozen in the annular gaps, thus restricting the shaft and the valve from freezing/sticking.

9 Claims, 8 Drawing Sheets

VALVE DEVICE FOR INTERNAL COMBUSTION ENGINE

CROSS REFERENCE TO RELATED APPLICATION

This application is based on a Japanese Patent Application No. 2004-372617 filed on Dec. 24, 2004, the disclosure of which is incorporated herein by reference.

FIELD OF THE INVENTION

The present invention relates to a valve device for an internal combustion engine, and more particularly to a valve freeze/sticking prevention construction for restricting water from flowing into annular gaps between a shaft and bearing members.

Generally, a throttle control device of electronic control type, as a suction throttle valve device for an internal combustion engine mounted in a vehicle, controls the rotation angle of a throttle valve by actuating a driving motor responding to an accelerator operation amount from a driver or the like. Referring to a first related art, as shown in FIGS. 5–7, the throttle control device includes a throttle body 101, a throttle valve 104 which is accommodated in the throttle body 101 and is openable and closable therein, and a throttle shaft 105 which has a valve holding portion for holding the throttle valve 104.

In this case, the throttle body 101 has a cylindrical portion 102 which constructs a part of an engine suction pipe. A throttle bore 103 (being a hollow portion used as suction passage) which has a circular cross section and communicates with the cylinder of the internal combustion engine is formed inside the cylindrical portion 102.

In addition, the throttle valve 104 is fixed to the throttle shaft 105 by fastening units such as screws, in a state where the throttle valve 104 is inserted into a valve insertion hole formed in the valve holding portion of the throttle shaft 105.

A power unit (valve driving device) for driving the throttle valve 104 and the throttle shaft 105 has a driving motor 106 as a driving source, and a reduction gear unit which reduces the rotation speed of the driving motor 106 so as to establish a predetermined reduction ratio.

The reduction gear unit has a pinion gear 111 which is fixed to the motor shaft of the driving motor 106, an intermediate reduction gear 112 which rotates in mesh with the pinion gear 111, and a valve gear 113 which rotates in mesh with the intermediate reduction gear 112.

A return spring 114 is arranged between the cylindrical portion 102 and the valve gear 113. The return spring 114 biases the throttle valve 104 to the side of a completely closed position (in valve closure direction) where the suction air amount is minimized.

A motor housing portion 122 which defines a motor accommodation hole 121 for accommodating and holding the driving motor 106, and a gear box portion 124 which defines a gear chamber 123 for rotatably accommodating the gears constructing the reduction gear unit, are integrally formed by a resin or a metal at the outer wall portion of the cylindrical portion 102.

Moreover, a throttle opening degree sensor for detecting a throttle opening degree is attached to the outer wall portion of the cylindrical portion 102. The throttle opening degree sensor includes a permanent magnet 125 which is fixed to the inner peripheral portion of the valve gear 113, and a magnetic detection element of noncontact type (not shown) which induces an electromotive force in response to a magnetic field generated by the permanent magnet 125. The valve gear 113 is integrated with one axial end portion of the throttle shaft 105.

The magnetic detection element is fixed to a sensor mounting portion 127 of a sensor cover 126 joined to the outer wall portion of the cylindrical portion 102, in a manner to be arranged opposite the inner surface of a yoke which is magnetized by the permanent magnet 125.

Referring a second related art, as shown in FIG. 8B, the two axial end portions of the throttle shaft 105 are respectively inserted into shaft slide holes 132 of bearing members 131 to be borne. In this case, the axial end portions of the throttle shaft 105 are slideable in the rotation direction of the throttle shaft 105. The axial end portions of the throttle shaft 105 penetrate through the shaft penetration holes 129 of the cylindrical portion 102 and the shaft slide holes 132 of the bearing members 131, to respectively protrude beyond the outer wall surfaces of the bearing members 131.

These throttle control devices of electronic control type are also used under the cold environments of the winter season, for example. Therefore, water contained in suction air which is sucked into the cylinder of the engine via the engine suction pipe including the cylindrical portion 102 of the throttle body 101, and water which is carried in along the wall surface of the suction passage from an upstream side in an air flow direction with respect to the cylindrical portion 102 of the throttle body 101, are intercepted by the throttle valve 104 to adhere onto the surface of the throttle valve 104.

In the case where the ambient temperature is below the freezing point, water will be cooled and frozen astride between the bore inner surface (throttle bore wall surface) of the cylindrical portion 102 and the outer-diameter-side end surface portion of the throttle valve 104. Then, the throttle valve 104 is frozen and stuck to the bore inner surface of the cylindrical portion 102. Thus, the throttle valve 104 may become incapable of rotating in a subsequent starting of the internal combustion engine. Accordingly, it is necessary to prevent the throttle valve 104 from freezing and sticking.

In order to solve the problem, referring to JP-2002-004893A, there has been proposed a suction throttle valve device for an internal combustion engine. In the suction throttle valve device, a communication passage which communicates throttle valve surfaces at the two sides of a throttle shaft is formed to extend under the throttle shaft. Waterdrop on the throttle valve surfaces flows from one side to the other side of a throttle valve through the communication passage. A storage wall for accumulating waterdrop which has flowed and gathered on the throttle valve surfaces is erected on the other side of the throttle valve.

In this suction throttle valve device, water does not flow out around the throttle valve, so that freezing around the throttle valve can be restricted. However, because the throttle shaft has a straight shape (simple inner-shaft round bar shape), water which has adhered to the throttle valve surfaces and a throttle shaft surface except the communication passage flows into an annular gap formed between the throttle shaft (105) and the cylindrical portion (102) of the throttle body (101), and an annular gap formed between the throttle shaft (105) and each bearing member (131), along the throttle shaft surface (referring to FIGS. 8A and 8B).

Thus, when the ambient temperature has become below the freezing point, water is frozen in the above-described gaps so that the throttle valve becomes incapable of rotating in the subsequently starting of the internal combustion engine. Moreover, the operation of the throttle valve corresponding to the accelerator operation amount of the driver cannot be attained. Furthermore, when water has been frozen in a state where the throttle valve and the throttle shaft are eccentric, in the annular gap formed between the throttle shaft and the cylindrical portion of the throttle body and the annular gap formed between the throttle shaft and the each bearing member, a large load torque is required for the driving motor and the like in order to rotating (driving) the throttle valve and the throttle shaft. Therefore, the suction air amount performance (of suction throttle valve device) with respect to the accelerator operation amount from the driver is deteriorated.

SUMMARY OF THE INVENTION

In view of the above disadvantages, it is an object of the present invention to provide a valve device for an internal combustion engine, in which water is restricted from flowing into annular gaps between a shaft and a housing and annular gaps between the shaft and bearing members so that a maloperation and an incapability in rotation of a valve can be restricted.

According to the present invention, a valve device for an internal combustion engine is provided with a housing which defines an air passage communicating with a cylinder of the internal combustion engine, a valve which is rotatably accommodated in the air passage, a shaft which holds the valve, and two bearing members which respectively slideably support two axial end portions of the shaft. At least one of the valve and the shaft has two diameter-enlarged portions which are respectively arranged at two end portions thereof with respect to an axially intermediate portion thereof. The two end portions are respectively disposed at sides of the bearing members. The diameter-enlarged portion has a larger outer diameter than that of the axially intermediate portion.

Thus, even when water in air sucked into the cylinder of the engine through an engine air-suction passage including the housing and water flowing to the passage wall from the air upstream side of the housing adhere to the surfaces of the valve and the shaft, water can be restricted from flowing into annular gaps between the shaft and the housing and annular gaps between the shaft and the bearing members because the diameter-enlarged portions obstruct water flowing toward the passage wall and the bearing members through the surface of the shaft.

Accordingly, even when the ambient temperature has become the freezing point or below it, water is not frozen in the annular gaps. Therefore, the drawback that the shaft and the valve are frozen and stuck can be restricted.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

Figure 1A:
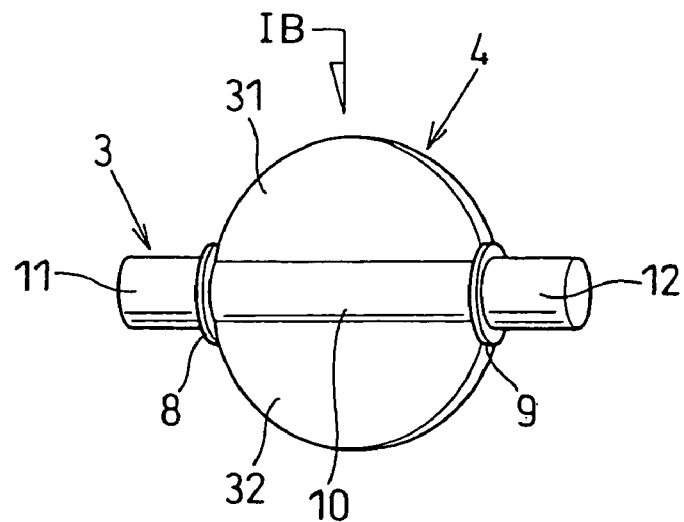
FIG. 1A is a perspective view showing a whole construction of a throttle valve according to a first embodiment of the present invention.

A first embodiment of the present invention is described with reference to FIGS. 1A and 1B. In this case, a valve device for an internal combustion engine is suitably used for a throttle control device of electronic control type, which is a suction throttle valve device for the internal combustion engine (throttle device for internal combustion engine). The throttle control device of electronic control type is provided with a throttle body 1, a throttle shaft 3, a throttle valve 4, a power unit (not shown), a coil spring (return spring, not shown), and an engine control unit (ECU).

The throttle body 1 defines a suction passage (air passage) that communicates with the interior of the combustion chamber of each cylinder of the internal combustion engine (engine), for example, a gasoline engine. The throttle shaft 3 penetrates through a cylindrical portion 2 of the throttle body 1 in the diametric direction thereof and is rotatably supported by the cylindrical portion 2. The throttle valve 4 is accommodated in the throttle body 1, and is openable and closable therein. The power unit is a valve drive unit which drives and rotates the throttle valve 4 in a valve opening direction or a valve closing direction. The coil spring is a valve biasing means for biasing the throttle valve 4 in the valve closing direction or the valve opening direction. The engine control unit (ECU) controls the valve opening degree (throttle opening degree) of the throttle valve 4 in correspondence with the accelerator operation amount from a driver or the like.

The power unit is provided with a driving motor (not shown) as a power source, and a reduction gear unit which reduces the rotation speed of the driving motor so as to establish a predetermined reduction ratio. The reduction gear unit includes a pinion gear (not shown) which is fixed to a motor shaft of the driving motor, an intermediate reduction gear (not shown) which rotates in mesh with the pinion gear, and a valve gear (not shown) which rotates in mesh with the intermediate reduction gear. This reduction gear unit is utilized as a power transmission mechanism which transmits the rotation power of the driving motor to the throttle shaft 3.

An accelerator opening degree sensor (not shown), being connected to the ECU, converts the accelerator operation amount (depression amount of accelerator pedal) by the driver into an electric signal (accelerator opening degree signal), and outputs how much the accelerator pedal is depressed to the ECU.

The throttle device for the internal combustion engine has a rotation angle sensor (throttle position sensor, not shown) which converts the valve opening degree (rotation angle) of the throttle valve 4 into an electric signal (throttle opening degree signal) and outputs to the ECU how much the throttle valve 4 is opened. The ECU feedback-controls a control signal for the driving motor so as to zeroize the deviation between the throttle opening degree signal outputted from the rotation angle sensor and the accelerator opening degree signal outputted from the accelerator opening degree sensor.

The rotation angle sensor has a permanent magnet of split type and a detection element of noncontact type (e.g., Hall element, Hall IC or magnetoresistance element). The permanent magnet of split type, being a magnetic field generation source, is mounted on one end portion or the other end portion of the throttle shaft 3. The detection element of noncontact type is arranged opposite to the inner surface of a yoke of split type that is magnetized by the magnet, and detects the rotation angle of the throttle valve 4 by receiving the magnetic force of the magnet.

The rotation angle sensor is integrally arranged in a sensor cover (not shown) which is mounted at the outer wall portion of the throttle body 1. The magnet and the yoke are fixed (by adhesive, for example) to the inner surface of the valve gear which is a part of the reduction gear unit.

The throttle body 1 in this embodiment is a throttle housing in which the throttle valve 4 is accommodated in an openable and closable state. The throttle housing has the cylindrical portion 2 (throttle bore wall portion) in which suction air to be sucked into the combustion chamber of each cylinder of the engine flows in the direction of the center axis of the cylindrical portion 2.

The throttle body 1 is a unit in which the throttle valve 4 is held rotatably in its rotation direction from a completely closed position to a completely open position. The throttle body 1 is fixed to the intake manifold of the engine, for example, by fastening through bolts, screws or the like (not shown).

A throttle bore 5 (which is hollow portion constructing air passage/suction passage) having a circular cross section, in which suction air flows toward the engine, is arranged inside the cylindrical portion 2.

According to this embodiment, suction air having been filtered by an air cleaner flows from the upper side (in FIG. 1B) into the throttle bore 5 via an engine suction pipe, then being sucked into the combustion chamber of the each cylinder of the engine via the intake manifold, which is connected to the lower side (in FIG. 1B) of the throttle body 1.

The cylindrical portion 2 of the throttle body 1 is integrally formed to have a predetermined shape of a substantially circular pipe by using, for example, a resin or a metal. The inner diameter and the outer diameter of the cylindrical portion 2 are substantially equal to each other in the flow direction (which is from upper side toward lower side in FIG. 1A) of suction air.

The cylindrical portion 2 has a first bearing support portion 13 and a second bearing support portion 14, which are integrated with the cylindrical portion 2 and respectively disposed at two sides thereof in a direction substantially orthogonal to the flow direction of suction air flowing in the throttle bore 5. The bearing support portions 13 and 14 rotatably support the two axial end portions (i.e., first and second bearing slide portions 11 and 12) of the throttle shaft 3 through a first bearing 6 (bearing member) and a second bearing 7 (bearing member).

A First shaft penetration hole 15 and a second shaft penetration hole 16, each of which has a circular cross section (circular space), are respectively provided in the first and second bearing support portions 13 and 14. An annular gap A is arranged between the outer surface of the first bearing slide portion 11 of the throttle shaft 3 and the inner surface of the first shaft penetration hole 15 of the cylindrical portion 2, for the sake of a smooth rotation of the throttle shaft 3 in the first bearing support portion 13. Similarly, an annular gap A is arranged between the outer surface of the second bearing slide portion 12 of the throttle shaft 3 and the inner surface of the second shaft penetration hole 16 of the cylindrical portion 2, for the sake of a smooth rotation of the throttle shaft 3 in the second bearing support portion 14.

Figure 1B:
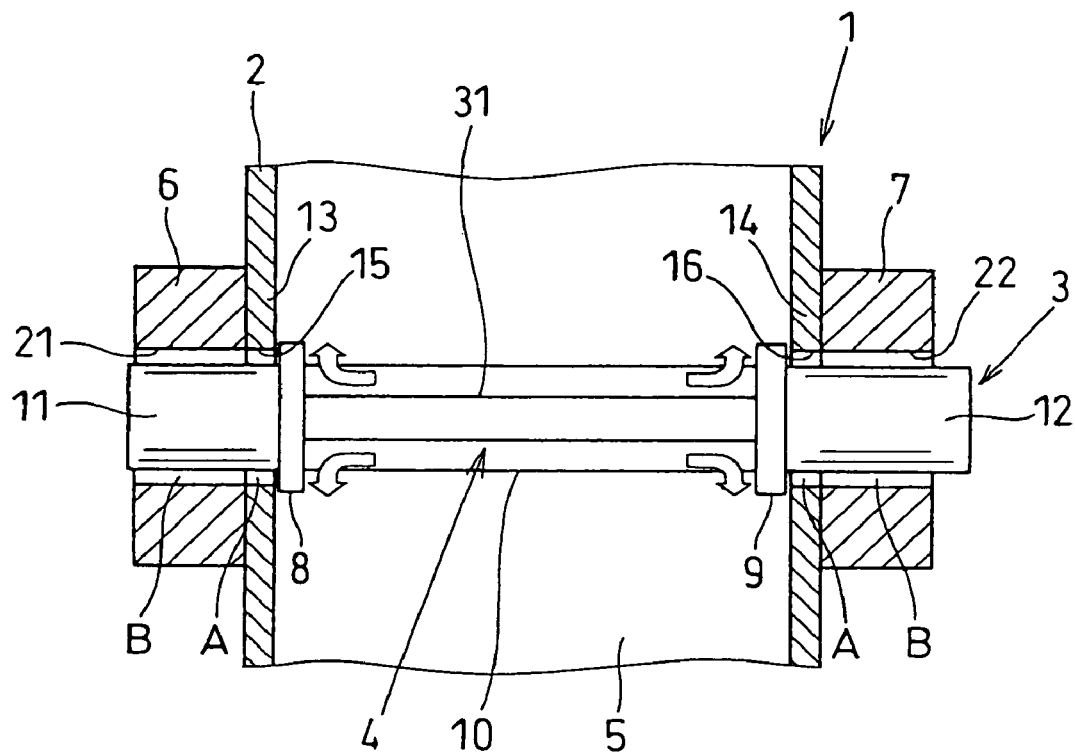
FIG. 1B is a view in an arrow direction IB in FIG. 1A.
Figure 7:
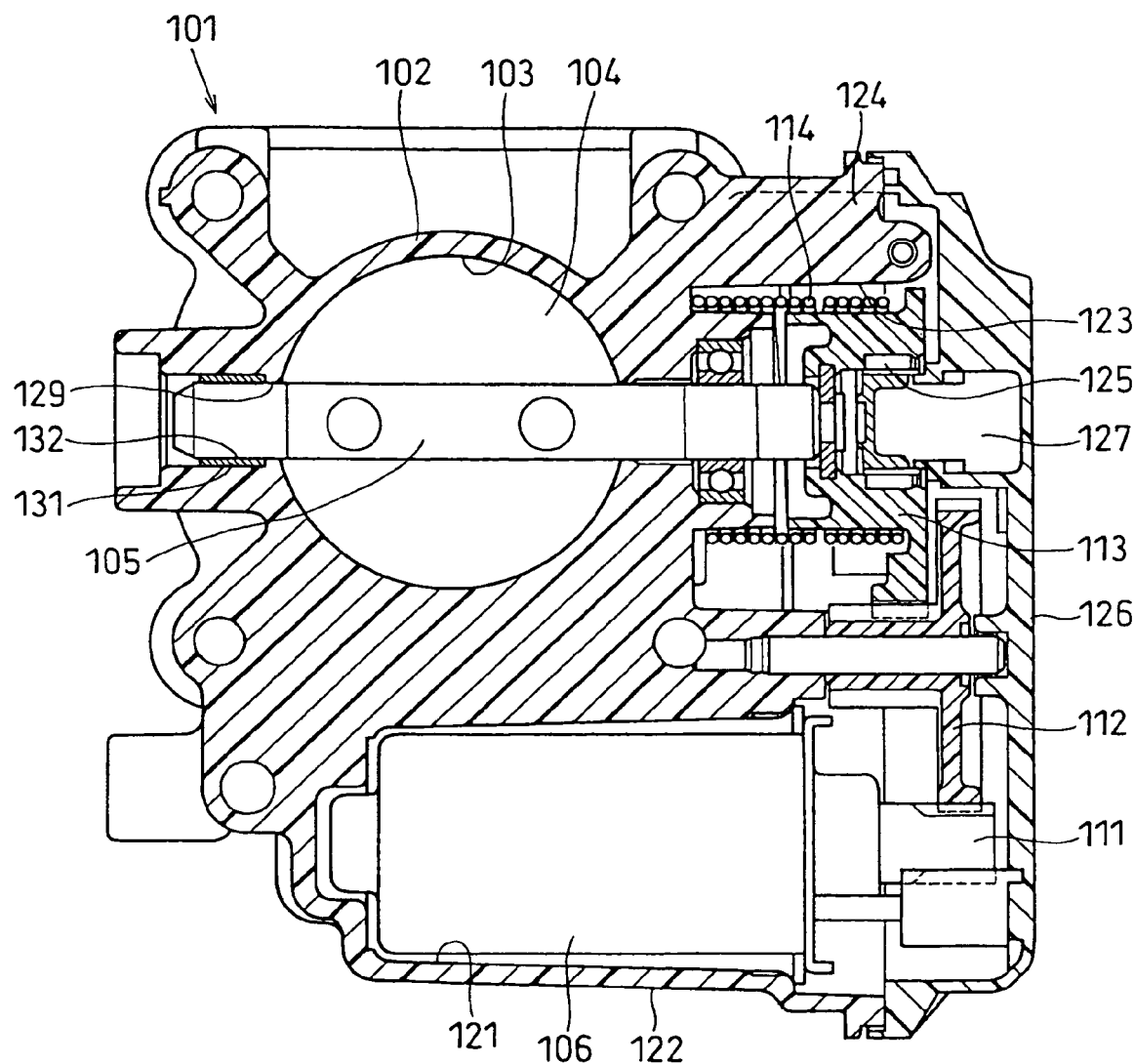
FIG. 7 is a cross-sectional view taken along a line VII—VII in FIG. 6.
Figure 8A:
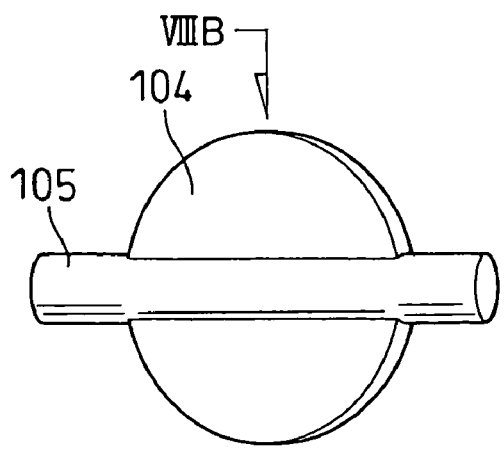
FIG. 8A is a perspective view showing a whole construction of a throttle valve according to a second related art.
Figure 8B:
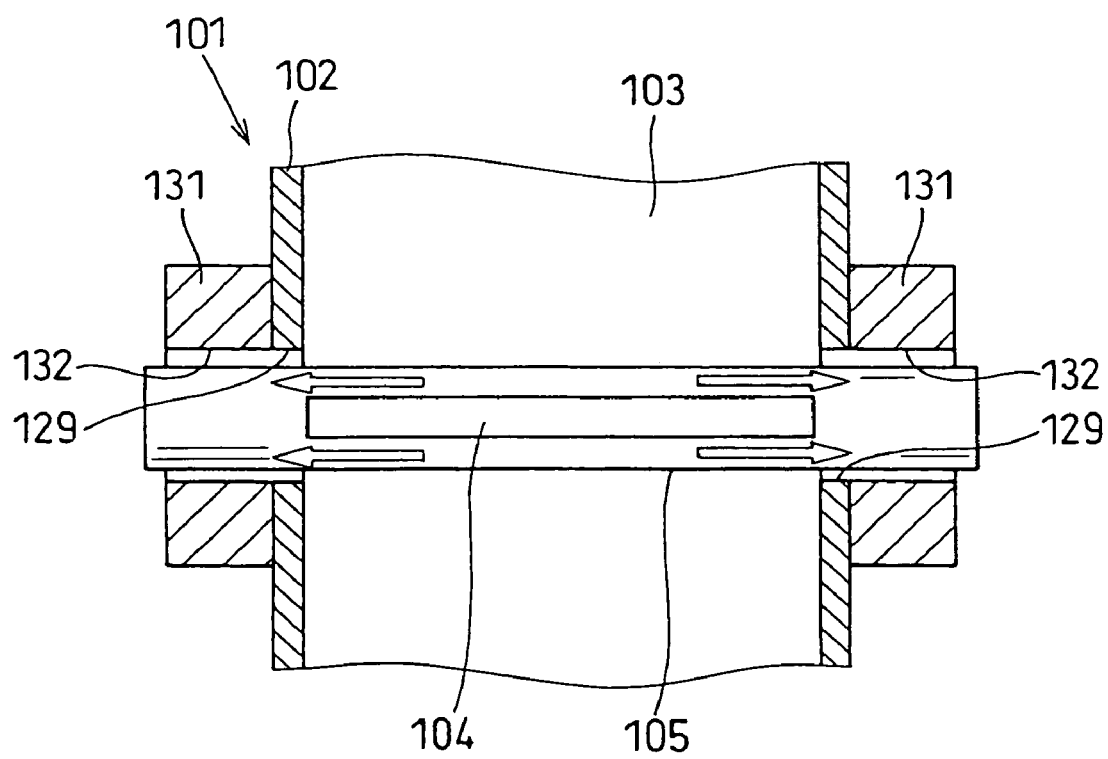
FIG. 8B is a view in an arrow direction VIIIB in FIG. 8A.

According to this embodiment, as shown in FIG. 1B, the outer wall surfaces of the first and second bearing support portions 13 and 14 are set so as to be flush with the outer wall surface of the cylindrical portion 2. Alternatively, at least one of the outer wall surface of the first bearing support portion 13 and that of the second bearing support portion 14 can also protrude in the axially outer side beyond the outer wall surface of the cylindrical portion 2 (referring to FIG. 7). Because at least one of the bearing support portions 13 and 14 has a substantially cylindrical shape, at least one of the bearings 6 and 7 can be also press-fitted into at least one of the shaft penetration holes 15 and 16.

Each of the first and second bearings 6 and 7 is a bearing member (e.g., plain bearing, thrust bearing, bearing bush or the like) which is integrally constructed to have a predetermined substantially cylindrical shape by a metal member (e.g., slide member of sintered bearing material with superior wear resistance, brass, oilless metal, copper or the like) or a resin member (e.g., resin collar).

A first shaft slide hole 21 and a second shaft slide hole 22 (circular spaces), each of which has a circular cross section, are respectively formed in the first and second bearings 6. The first and second bearing slide portions 11 and 12 of the throttle shaft 3 are respectively inserted through the shaft slide holes 21 and 22 to be supported slideably in the rotation direction of this throttle shaft 3.

An annular gap B narrower than the annular gap A is arranged between the outer surface of the first bearing slide portion 11 of the throttle shaft 3 and the inner surface of the first shaft slide hole 21 of the first bearing 6, for the sake of the smooth rotation of the throttle shaft 3 in the first bearing 6. Similarly, an annular gap B narrower than the annular gap A is arranged between the outer surface of the second bearing slide portion 12 of the throttle shaft 3 and the inner surface of the second shaft slide hole 22 of the second bearing 7, for the sake of the smooth rotation of the throttle shaft 3 in the second bearing 7.

In this embodiment, the bearing 6, 7 is constructed by molding, inner diameter cutting or inner diameter grinding or the like, so that the shaft slide hole 21, 22 is provided with the cross section having a truly circular shape. Therefore, the precision of the gap between the bearing slide portion 11, 12 of the throttle shaft 3 and the shaft slide hole 21, 22 of the bearing 6, 7 is enhanced.

The throttle shaft 3 is a metal shaft (rotary shaft) which is made of a metal, for example, brass or stainless steel. The rotation axis direction (axis direction) of the throttle shaft 3 is set to be substantially orthogonal to the flow direction of suction air which flows in the throttle bore 5 of the cylindrical portion 2 of the throttle body 1.

Each of the axial end portions of the throttle shaft 3 is provided with a substantial column shape, and has a substantially same outer diameter with that of the axially intermediate portion of the throttle shaft 3. The throttle shaft 3 traverses the throttle bore 5 in the diametric direction of the throttle bore 5. The two axial end portions of the throttle shaft 3 are respectively rotatably supported by the first and second bearing support portions 13 and 14 of the cylindrical portion 2 through the first and second bearings 6 and 7.

The one axial end portion of the throttle shaft 3 penetrates through the first shaft penetration hole 15 of the first bearing support portion 13, and protrudes to the side of the first bearing 6 beyond the outer surface of the cylindrical portion 2. Furthermore, the one axial end portion of the throttle shaft 3 penetrates through the first shaft slide hole 21 of the first bearing 6, and protrudes to the axial outer side beyond the outside end surface of the first bearing 6.

Similarly, the other axial end portion of the throttle shaft 3 penetrates through the second shaft penetration hole 16 of the second bearing support portion 14, and protrudes to the side of the second bearing 7 beyond the outer surface of the cylindrical portion 2. Furthermore, the other axial end portion of the throttle shaft 3 penetrates through the second shaft slide hole 22 of the second bearing 7, and protrudes to the axial outer side beyond the outside end face of the second bearing 7.

The axially intermediate portion of the throttle shaft 3 functions as a valve holding portion 10 which fixedly holds the throttle valve 4. The one axial end portion of the throttle shaft 3 is exposed (protruded) from the bearing-side annular end surface of the throttle valve 4, to function as the first bearing slide portion 11 which rotatably slides in the first shaft slide hole 21 of the first bearing 6. Similarly, the other axial end portion of the throttle shaft 3 is exposed (protruded) from the bearing-side annular end surface of the throttle valve 4, to function as the second bearing slide portion 12 which rotatably slides in the second shaft slide hole 22 of the second bearing 7.

The valve gear, being a constituent of the reduction gear unit, is fixedly mounted to the one axial end portion (or the other axial end portion) of the throttle shaft 3 by swaging or the like.

According to this embodiment, the throttle valve 4 is a butterfly-type rotary valve having a substantial circular-plate shape, and has a rotation center axis which is substantially perpendicular to the center axial direction of the cylindrical portion 2 of the throttle body 1. The rotation angle of the throttle valve 4 can be adjusted from the completely closed position to the completely open position, so that the amount of suction air which is sucked into the combustion chamber of the each cylinder of the engine is controlled.

The throttle valve 4 is integrally molded to have a predetermined shape by injection molding. The throttle valve 4 is made of a resin such as a thermoplastic resin, for example, a heat resisting resin such as polyphenylene sulfide (PPS), polybutylene terephthalate (PBT), polyamide resin (PA), polypropylene (PP), polyether imide (PEI) or the like, which is injected into a die (mold) to mold the throttle valve 4.

The throttle valve 4 has a circular plate-shaped portion whose plate thickness is smaller than the outer diameter of the valve holding portion 10 of the throttle shaft 3. The circular plate-shaped portion includes disc portions 31 and 32 each of which has a shape of a substantially semicircular plate.

The disc portion 31 is disposed at one side of a radius direction (of valve holding portion 10) which is substantially perpendicular to the axial direction of the valve holding portion 10. When the throttle valve 4 is completely open, the disc portion 31 is positioned at one side of the center axis direction of the throttle bore 5 (e.g., upstream side of flow direction of suction air). The disc portion 32 is disposed at the other side of the radius direction (of valve holding portion 10) which is substantially perpendicular to the axial direction of the valve holding portion 10. When the throttle valve 4 is completely open, the disc portion 32 is positioned at the other side of the center axis direction of the throttle bore 5 (e.g., downstream side of flow direction of suction air).

The disc portions 31 and 32 are integrated with the valve holding portion 10 of the throttle shaft 3, and protrudes from the outer surface of the valve holding portion 10 toward the outer side of the radius direction of the valve holding portion 10.

The outer periphery (i.e., outer-diameter side end) of the disc portion 31, 32 is provided with a shape conforming to that of the inner surface of the cylindrical portion 2 (inner-diameter surface of throttle bore 5). At least one (e.g., one of upstream side of suction air flowing in throttle bore 5) of the outer peripheries of the disc portions 31 and 32 can be integrated with a reinforcement rib (not shown) for reinforcing the disc portion 31, 32.

First and second flange portions 8 and 9 are respectively integrally formed at two axial (direction of rotation axis) end portions of the throttle valve 4. The axial end portions are respectively disposed at the sides of the bearings 6 and 7 with respect to the axially intermediate portion of the throttle valve 4. That is, the first and second flange portion 8, 9 is arranged at the outer peripheries (of side of throttle shaft 3) of the disc portions 31 and 32.

The outer diameter of the flange portion 8, 9 is larger than that of the axially intermediate portion of the throttle valve 4. That is, the outer diameter of the flange portion 8, 9 is larger than that of the valve holding portion 10 of the throttle shaft 3.

The flange portion 8, 9 continuously surrounds the throttle shaft 3, and closely contacts the circumferential whole of the bearing-side outer surface of the throttle shaft 3.

As shown in FIG. 1B, the first and second flange portions 8 and 9 function as diameter-enlarged portions (interception portions) for intercepting water, which flows toward the bore inner surface (near bearing support portions 13 and 14) of the cylindrical portion 2 and the bearings 6, 7 along the surface of the throttle shaft 3.

The outer diameter of the flange portion 8, 9 is larger than the inner diameter of the shaft slide hole 21, 22 of the bearing 6, 7, and the inner diameter of the shaft penetration hole 15, 16 of the bearing support portion 13, 14.

Thus, the bearing-side annular end surface of the flange portion 8, 9 faces the bore inner surface (near bearing support portion 13, 14) of the cylindrical portion 2, and overlaps the bore inner surface in the radius direction of the flange portion 8, 9. In this case, the first flange portion 8 obstructs (covers) the annular gap A which is disposed between the first bearing slide portion 11 of the throttle shaft 3 and the first shaft penetration hole 15 of the cylindrical portion 2, and the annular gap B which is disposed between the first bearing slide portion 11 and the first shaft slide hole 21 of the first bearing 6. The second flange portion 9 obstructs (covers) the annular gap A which is disposed between the second bearing slide portion 12 of the throttle shaft 3 and the second shaft penetration hole 16 of the cylindrical portion 2, and the annular gap B which is disposed between the second bearing slide portion 12 and the second shaft slide hole 22 of the second bearing 7.

Next, an injection molding method for the throttle valve 4 according to this embodiment will be described.

First, at a first step (mold clamping step), the throttle shaft 3 and the cylindrical portion 2 of the throttle body 1 are set in an injection-molding die, and then the injection-molding die is clamped. Thus, a valve cavity provided with a shape corresponding to the product shape of the throttle valve 4 is formed in the injection-molding die.

Subsequently, at a second step (injecting/filling step), a resin material which is heated to be molten is injected from one or more body gates into the valve cavity formed by the injection-molding die, to fill the valve cavity. In this case, the bore inner surface of the cylindrical portion 2 held in the injection-molding die is used as a part of the injection-molding die for molding the outer periphery of the circular plate-shaped portion (including disc portions 31 and 32) of the throttle valve 4 and the bearing-side annular end surfaces of the first and second flange portions 8 and 9.

Then, the resin member disposed in the valve cavity of the injection-molding die is taken out and cooled to be hardened (solidified). Alternatively, the resin member can be cooled and hardened (solidified) in the valve cavity of the injection-molding die by using cooling water or the like. Then, a product in which the throttle valve 4 is rotatably assembled in the cylindrical portion 2 of the throttle body 1 is manufactured. In this case, the throttle shaft 3 is inserted through the first and second flange portions 8 and 9 of the throttle valve 4, so that the throttle shaft 3 and the throttle valve 4 can be integrally rotate.

In this case, the bore inner surface of the cylindrical portion 2 is used as the part of the injection-molding die for molding the outer periphery of the circular plate-shaped portion of the throttle valve 4 and the bearing-side annular end surfaces of the first and second flange portions 8 and 9. Therefore, the shape of the outer periphery of the circular plate-shaped portion of the throttle valve 4 conforms to that of the bore inner surface of the cylindrical portion 2. Moreover, the gap between the bore inner surface of the cylindrical portion 2 and the outer periphery of the circular plate-shaped portion of the throttle valve 4 becomes the required minimum, to permit the throttle valve 4 to rotate in the throttle bore 5 having the circular-shaped cross section.

According to the first embodiment, the throttle valve 4 is provided with the first and second flange portions 8 and 9 which has the circularly annular shape surrounding the outer periphery of the throttle shaft 3. The outer diameter of the flange portion 8, 9 is larger than the inner diameter of the shaft penetration hole 15, 16 and the inner diameter of the shaft slide hole 21, 22.

Therefore, the throttle device 4 according to this embodiment cannot be manufactured in a method similarly to that of the throttle control device of the first related art. In the first related art, after the throttle shaft 105 has been set to penetrate through the cylindrical portion 102 of the throttle body 101 in the diametrical direction of the cylindrical portion 102, the throttle valve 104 is inserted into the valve insertion hole formed at the valve holding portion of the throttle shaft 105. Then, the throttle valve 104 is fixedly clamped to the throttle shaft 105 by clamp units such as screws.

Accordingly, it is preferable to mold the throttle valve 4 by the above-described method, in which the bore inner surface of the cylindrical portion 2 is used as the part of the injection-molding die.

Next, the operation of the throttle device for the internal combustion engine according to this embodiment will be described with reference to FIGS. 1A and 1B.

When the driver depresses the accelerator pedal, the accelerator opening degree signal is inputted to the ECU by the accelerator opening degree sensor. Thus, the ECU activates the driving motor so that the motor shaft of the driving shaft is rotated, in order to provide a predetermined throttle opening degree (rotation angle) for the throttle valve 4. The torque of the driving motor is transmitted to the pinion gear, the intermediate reduction gear and the valve gear. Thus, the valve gear is rotated at a rotation angle corresponding to the depression amount of the accelerator pedal (accelerator operation amount), against the biasing force of the return spring.

Thus, the throttle shaft 3 is rotated at the same rotation angle as that of the valve gear, so that the throttle valve 4 is driven to rotate in the opening direction (completely open direction) from the completely closed position toward the completely open position of the throttle valve 4. As a result, the throttle bore 5 formed inside the cylindrical portion 2 of the throttle body 1 is opened based on the predetermined rotation angle. Thus, the rotation speed of the engine is altered to a speed corresponding to the depression amount of the accelerator pedal (accelerator manipulated variable).

As described above, in the throttle control device of electronic control type according to this embodiment, the first and second flange portions 8, 9 are respectively provided at the two end portions (of bearing sides with respect to axially intermediate portion) of the throttle valve 4. That is, the first and second flange portions 8, 9 are respectively arranged at two circumferential positions, which are disposed at the outer periphery of the circular plate-shaped portion and positioned at the shaft sides (rotation center axis sides) of the disc portions 31 and 32.

The first and second flange portion 8, 9 is provided with the outer diameter, which is larger than the outer diameter of the axially intermediate portion of the throttle valve 4, that is, the outer diameter of the valve holding portion 10 of the throttle shaft 3.

Water contained in suction air that is sucked into the combustion chamber of the each cylinder of the engine via the engine suction pipe, and water carried in along the passage wall surface of the suction passage and the bore inner surface of the cylindrical portion 2 from an upstream side in an air flow direction with respect to the cylindrical portion 2, will adhere to the surface of the throttle valve 4 and the surface of the throttle shaft 3 and flow toward the bore inner surface of the cylindrical portion 2 in the vicinity of the bearing support portions 13 and 14 (in vicinity of surroundings of shaft penetration holes 15 and 16) and toward the shaft slide holes 21 and 22 of the bearings 6 and 7 along the surface of the valve holding portion 10 of the throttle shaft 3.

According to the first embodiment, water which flows toward the bore inner surface of the cylindrical portion 2 and the bearings 6 and 7 can be intercepted by the valve-side annular end surfaces of the flange portions 8 and 9.

More specifically, water at the surface of the disc portion 31 located at an upper side (of up-down direction) gets over (flows along) the exposed part of the valve holding portion 10 (i.e., part at which throttle valve 4 is not molded) at a lower side of the disc portion 31, to flow to the surface of the disc portion 32 located at a lower side of the valve holding portion 10 before arriving at the valve-side annular end surface of the flange portion 8, 9. Water at the surface of the disc portion 32 will drop onto the bore inner surface of the cylindrical portion 2 which is not in the vicinity of the first or second bearing support portion 13 or 14, along the surface of the disc portion 32.

Thus, water can be restricted from flowing into the annular gaps A which are disposed between the bearing slide portions 11, 12 of the throttle shaft 3 and the shaft penetration holes 15, 16 of the bearing support portions 13 and 14, and into the annular gaps B which are disposed between the bearing slide portions 11, 12 of the throttle shaft 3 and the shaft slide holes 21, 22 of the bearings 6 and 7.

Accordingly, even when the ambient temperature has become the freezing point or below it, water is not frozen in the annular gaps A and B. Therefore, the drawback that the throttle shaft 3 and the throttle valve 4 are frozen and stuck at, for example, the valve completely-closed position, can be restricted.

Because the freezing/sticking of the throttle shaft 3 and the throttle valve 4 can be restricted, the throttle shaft 3 and the throttle valve 4 is capable of rotating in the subsequent starting of the engine. That is, the rotation angle of the throttle valve 4 and the suction air amount corresponding to the accelerator operation amount of the driver can be attained in the subsequent starting of the engine.

Moreover, water is restricted from freezing in the annular gaps A and B in a state where the throttle shaft 3 and the throttle valve 4 are eccentric. Thus, the load torque of the valve drive device (especially, driving motor) can be prevented from increasing. Therefore, the characteristic of the suction air amount versus the accelerator operation amount of the driver can be improved, thus bettering the drivability.

In this embodiment, the disc portions 31 and 32 and the first and second flange portions 8 and 9 of the throttle valve 4 are simultaneously molded by injection molding (resinous unitary molding) in the injection-molding die. Alternatively, the throttle valve 4 can be also manufactured as described in the first related art. In this case, the circular plate-shaped portion is beforehand molded in a substantially truly circular shape, and the throttle shaft 3 is set to penetrate through the cylindrical portion 2 of the throttle body 1 in the diametrical direction of the cylindrical portion 12. The circular plate-shaped portion is thereafter inserted into a valve insertion hole formed in the valve holding portion 10 of the throttle shaft 3. The circular plate-shaped portion is further clamped and fixed to the valve holding portion 10 of the throttle shaft 3 by clamp units such as screws. Thereafter, the circular plate-shaped portion and the first and second flange portions 8 and 9 are integrated by using the bore inner surface of the cylindrical portion 2 as a part of the injection-molding die for molding the bearing-side annular end surfaces of the first and second flange portions 8 and 9.

In this embodiment, the disc portions 31 and 32 of the throttle valve 4 are integrated with the first and second flange portions 8 and 9. However, a first flange portion can be also integrally formed between the first bearing slide portion 11 and the first bearing side portion of the valve holding portion 10 of the throttle shaft 3, and a second flange portion can be also integrally formed between the second bearing slide portion 12 and the second bearing side portion of the valve holding portion 10. The first flange portion has a larger outer diameter than those of the valve holding portion 10 and the first bearing slide portion 11, and the second flange portion has a larger outer diameter than those of the valve holding portion 10 and the second bearing slide portion 12.

Second Embodiment

Figure 2A:
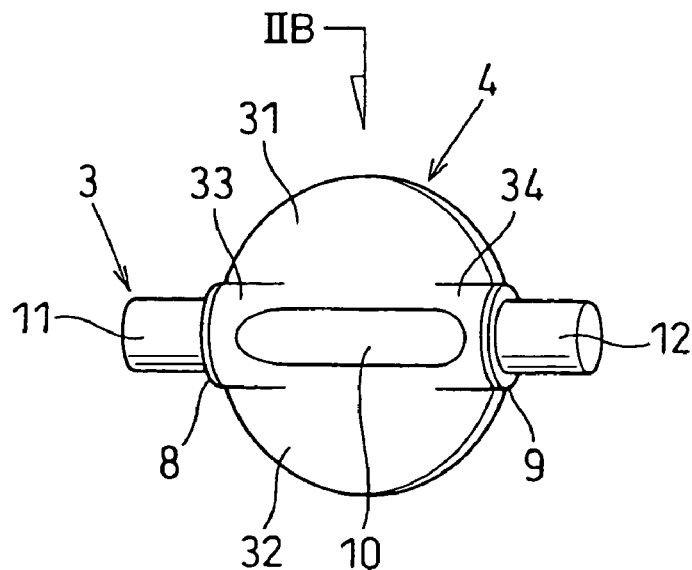
FIG. 2A is a perspective view showing a whole construction of a throttle valve according to a second embodiment of the present invention.
Figure 2B:
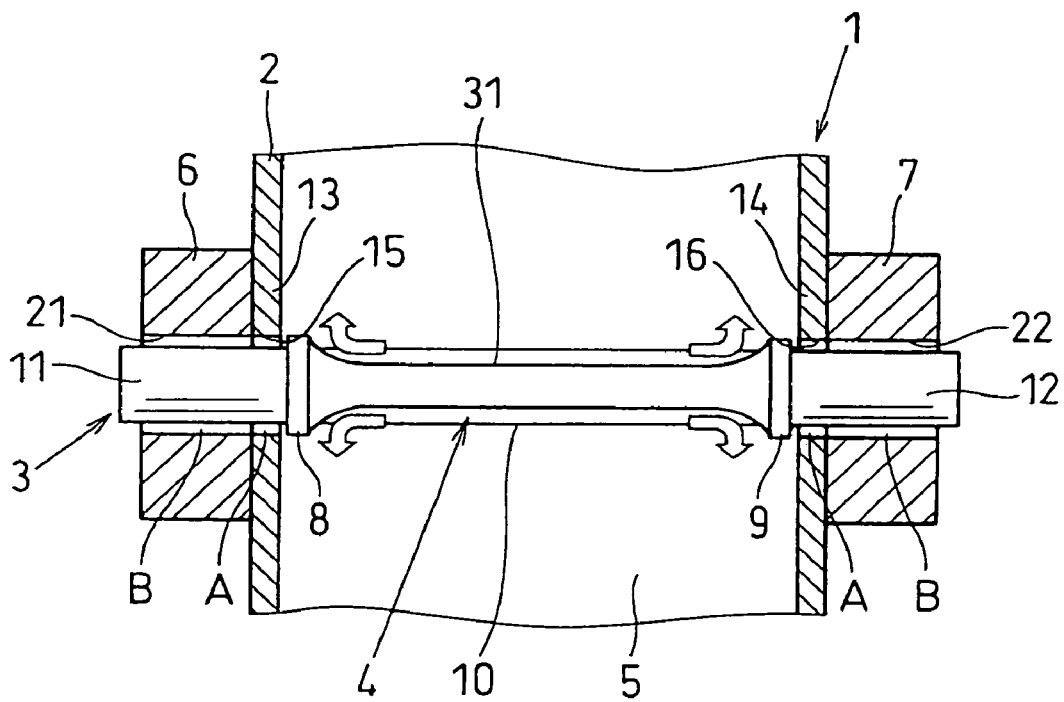
FIG. 2B is a view in an arrow direction IIB in FIG. 2A.

A second embodiment of the present invention is described with reference to FIGS. 2A and 2B.

In this case, the throttle valve 4 is provided with first and second taper portions 33 and 34, each of which has a truncated conical cylinder shape. The outer diameter of the taper portion 33, 34 increases gradually from the outer periphery of the shaft side (rotation center axis side) of the disc portions 31 and 32, toward the valve-side annular end surface of the flange portion 8, 9.

Thus, water at the surface of the disc portion 31 located at the upper side will get over (flow along) the taper portion 33, 34 at the lower side of the disc portion 31, to flow to the surface of the disc portion 32 at the lower side of the taper portion 33, 34 before arriving at the flange portion 8, 9. Water at the surface of the disc portion 32 will drop to the bore inner surface of the cylindrical portion 2 which is not in the vicinity of the bearing support portion 13, 14.

Thus, water can be restricted from flowing into the annular gaps A which are respectively disposed between the bearing slide portions 11, 12 of the throttle shaft 3 and the shaft penetration holes 15, 16 of the bearing support portions 13, 14, and into the annular gaps B which are disposed between the bearing slide portions 11, 12 of the throttle shaft 3 and the shaft slide holes 21, 22 of the bearings 6, 7.

Accordingly, even when the ambient temperature has become the freezing point or below it, water is not frozen in the annular gaps A and B. The drawback that the throttle shaft 3 and the throttle valve 4 are frozen and stuck at, for example, a valve completely-closed position, can be restricted.

Third Embodiment

Figure 3A:
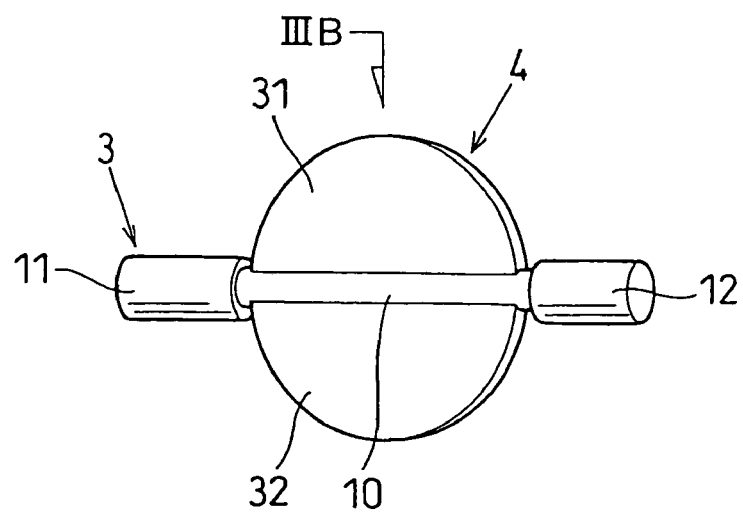
FIG. 3A is a perspective view showing a whole construction of a throttle valve according to a third embodiment of the present invention.
Figure 3B:
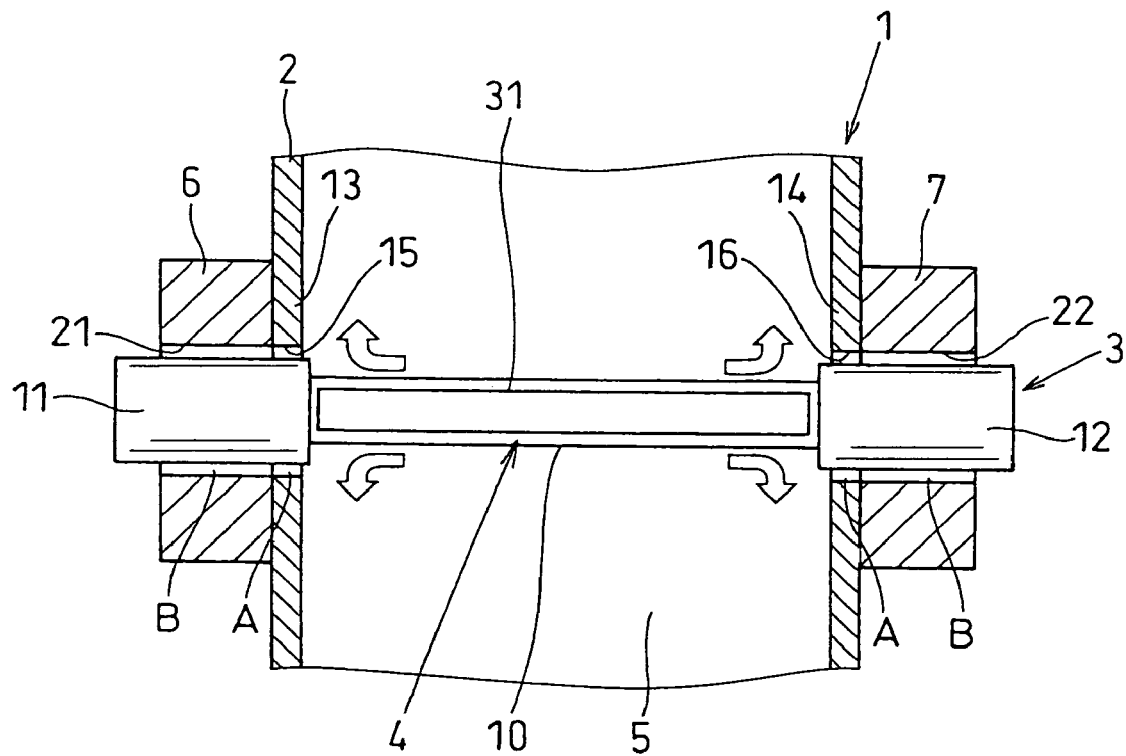
FIG. 3B is a view in an arrow direction IIIB in FIG. 3A.

A third embodiment of the present invention is described with reference to FIGS. 3A and 3B.

In this embodiment, the throttle shaft 3 is provided with a minimum outer diameter portion at the substantially axial-center part of the throttle shaft 3, and two maximum outer diameter portions which are respectively disposed at the two axial end portions of the throttle shaft 3. The maximum outer diameter portion has a larger outer diameter than that of the minimum outer diameter portion.

In this case, the minimum outer diameter portion positioned at the substantially axial-center part of the throttle shaft 3 functions as the valve holding portion 10 which fixedly supports the disc portions 31 and 32 of the throttle valve 4.

The maximum outer diameter portion at the one axial end side (first bearing side) of the throttle shaft 3 functions as the first bearing slide portion 11, which rotatably slides in the first bearing support portion 13 of a cylindrical portion 2 through the first bearing 6. The maximum outer diameter portion at the other axial end side (second bearing side) of the throttle shaft 3 functions as the second bearing slide portion 12, which rotatably slides in the second bearing support portion 14 of the cylindrical portion 2 through the second bearing 7.

In this case, the first and second bearing slide portions 11 and 12 of the throttle shaft 3 have the outer diameter larger than that of the valve holding portion 10 of the throttle shaft 3, to function as diameter-enlarged portions (interception portions) which intercept water flowing toward the bore inner surface of the cylindrical portion 2 in the vicinity of the bearing support portions 13 and 14 and toward the bearings 6 and 7, along the surface of the valve holding portion 10.

Accordingly, even when the ambient temperature has become the freezing point or below it, water are not frozen in the annular gaps A and B. Therefore, the drawback that the throttle shaft 3 and the throttle valve 4 are frozen and stuck at, for example, a valve completely-closed position, can be restricted.

In the third embodiment, the throttle device can be also manufactured as described as following. The throttle shaft 3 is molded to have a substantially truly circular shape, and set to penetrate through the cylindrical portion 2 of the throttle body 1 in the diametrical direction of the cylindrical portion 2. Thereafter, the throttle valve 4 is inserted into a valve insertion hole (not shown) formed in the valve holding portion 10 of the throttle shaft 3, and then fixed to the valve holding portion 10 of the throttle shaft 3 by clamp units such as screws.

Fourth Embodiment

Figure 4A:
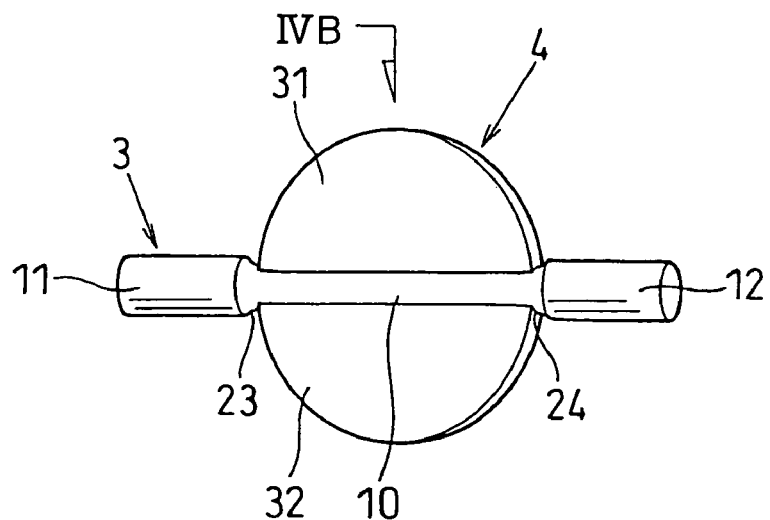
FIG. 4A is a perspective view showing a whole structure of a throttle valve according to a fourth embodiment of the present invention.
Figure 4B:
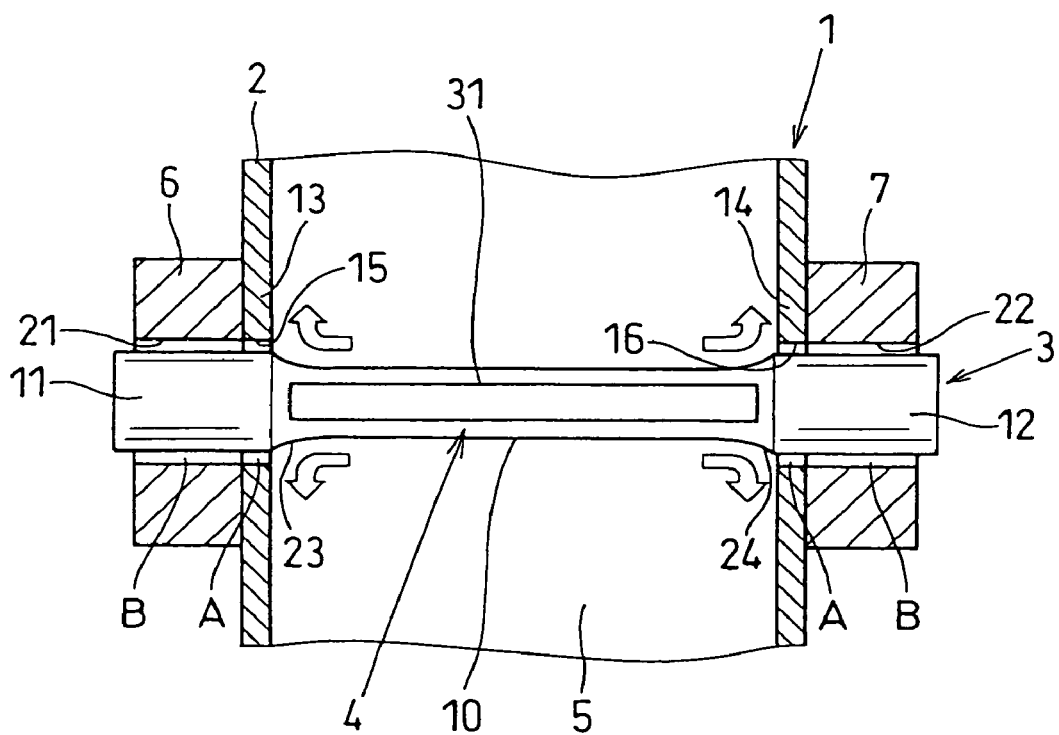
FIG. 4B is a view in an arrow direction IVB in FIG. 4A.
Figure 5:
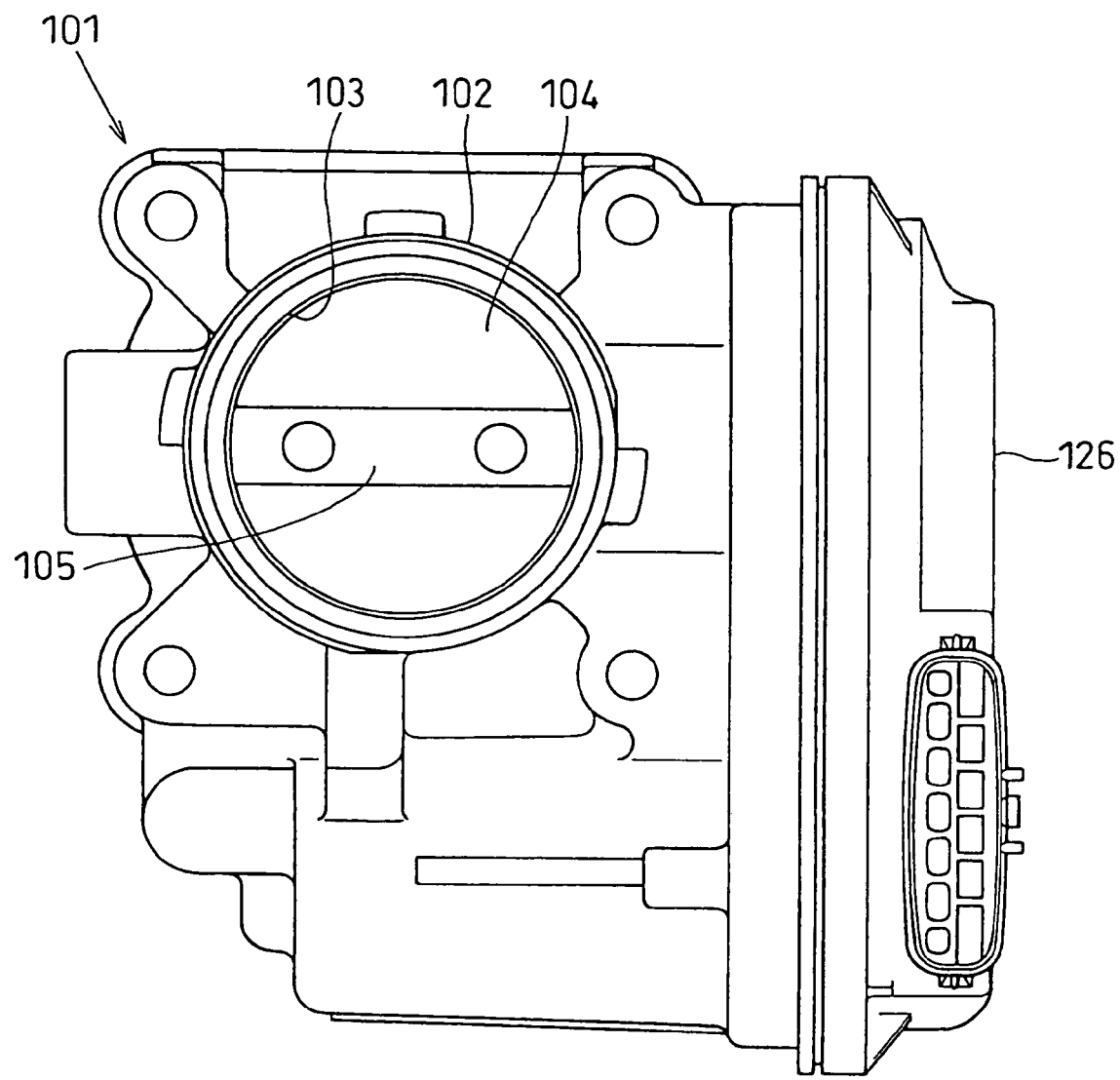
FIG. 5 is a front view showing a whole construction of a throttle control device of electronic control type according to a first related art.
Figure 6:
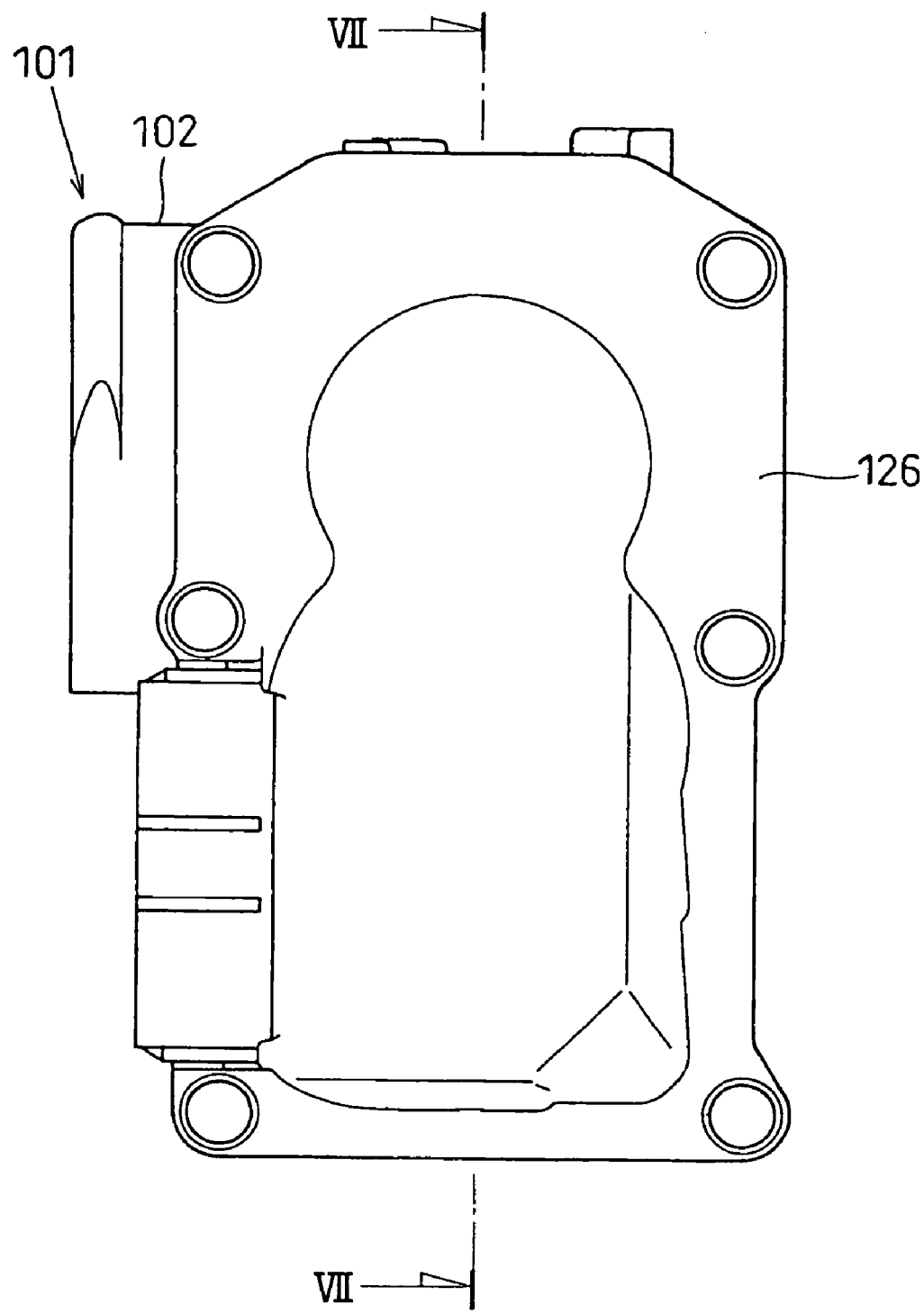
FIG. 6 is a side view showing the whole construction of the throttle control device of electronic control type according to the first related art.

A fourth embodiment of the present invention is described with reference to FIGS. 4A and 4B.

According to this embodiment, the throttle shaft 3 is provided with first and second taper portions 23 and 24, each of which has a truncated conical cylinder shape. The outer diameters of the taper portions 23 and 24 gradually increase respectively from the bearing-side end portions of the valve holding portion 10 toward the valve-side annular end surfaces of the first and second bearing slide portions 11 and 12.

Thus, water at the surface of the disc portion 31 will get over (flows through) the taper portion 23, 24 at the lower side of the disc portion 31, to flow to the surface of the disc portion 32 positioned at the lower side of the taper portions 23 and 24 before arriving at the shaft bearing slide portion 11, 12. Water at the surface of the disc portion 32 will drop to the bore inner surface of the cylindrical portion 2 which is not in the vicinity of the bearing support portion 13, 14.

Thus, water can be restricted from flowing into the annular gaps A which are disposed between the bearing slide portions 11, 12 of the throttle shaft 3 and the shaft penetration holes 15, 16 of the bearing support portions 13 and 14 of the cylindrical portion 2, and into the annular gaps B which are disposed between the bearing slide portions 11, 12 and the shaft slide holes 21, 22 of the bearings 6, 7.

Accordingly, even when an ambient temperature has become the freezing point or below it, water is not frozen in the annular gaps A and B. Therefore, the drawback that the throttle shaft 3 and the throttle valve 4 are frozen and stuck at, for example, a valve completely-closed position, can be restricted.

Other Embodiments

Although the present invention has been fully described in connection with the preferred embodiments thereof with reference to the accompanying drawings, it is to be noted that various changes and modifications will become apparent to those skilled in the art.

In the above-described embodiments, the valve device for the internal combustion engine of the present invention is suitably used for the throttle device for the internal combustion engine (throttle control device of electronic control type). In this case, the rotation power of the driving motor (actuator) is transmitted to the shaft (e.g., throttle shaft 3) via the power transmission mechanism such as the reduction gear unit, to control the rotation angle (valve opening degree, or throttle opening degree) of the throttle valve 4 in correspondence with the accelerator operation amount of the driver.

However, the valve device for the internal combustion engine can be also used for a throttle device which does not include the power unit such as the driving motor. In this case, the valve gear which is integrally disposed at the one axial end portion (or the other axial end portion) of the throttle shaft 3 is replaced with an accelerator lever, which is mechanically connected to the accelerator pedal or a throttle lever through a wire cable, for example. Thus, the accelerator operation amount of the driver can be transmitted to the throttle valve 4 and the throttle shaft 3.

In the above-described embodiments, the throttle valve 4 is integrally formed by the resin, while the throttle shaft 3 is integrally formed of the metal or the resin. However, both the throttle valve 4 and the throttle shaft 3 can be integrally formed by the resin. Moreover, the throttle shaft 3 can be provided with a resin shaft portion (cylindrical portion) near the axially intermediate portion of the throttle shaft 3, and the throttle valve 4 can be provided with a resin shaft portion (cylindrical portion) near the axially intermediate portion of the throttle valve 4. The resin shaft portion of the throttle shaft 3 and that of the throttle valve 4 are thermally melt to be joined to each other.

Moreover, the outer peripheral surface of the throttle shaft 3 can be also partially or wholly provided with a knurl process or the like, to improve the engagement performance (join performance) between the inner peripheries of the flange portions 8 and 9 of the throttle valve 4 and the outer periphery of the throttle shaft 3. Thus, the throttle valve 4 can be restricted from axially moving relative to the throttle shaft 3, so that the first and second flange portions 8 and 9 can be prevented from leaving the throttle shaft 3. For example, the outer peripheral surface of the throttle shaft 3 can be partially or wholly provided with notches or rugged parts. Alternatively, the cross section of the throttle shaft 3 can be provided with a substantially circular shape having width across flats, and the cross section of each of the flange portions 8 and 9 of the throttle valve 4 can be provided with a substantially circularly annular shape having width across flats. Thus, the relative rotation between the throttle shaft 3 and the flange portion 8, 9 of the throttle valve 4 can be restricted.

In the above-described embodiments, the valve device for the internal combustion engine is suitably used for the suction throttle valve device for the internal combustion engine. However, the valve device for the internal combustion engine can be also suitably used for a flow amount control valve for the internal combustion engine, for example, an idling rotation speed control valve device (ISCV), an exhaust back-flow amount control valve device which is used in an exhaust gas recirculation unit, or the like. Moreover, the valve device for the internal combustion engine can be also suitably used for a valve device for the internal combustion engine which is used in a variable suction system. Moreover, the valve device for the internal combustion engine can be also suitably used a swirl flow control valve device or a tumble flow control valve device which generates eddy currents in air that flows from the suction port of the internal combustion engine into the combustion chamber thereof.

In the above-described embodiments, the two axial end portions (bearing slide portions 11 and 12) of the throttle shaft 3 are supported in the shaft slide holes 21 and 22 of the bearings 6 and 7 to be slideable in the rotation direction of the throttle shaft 3. However, the two axial end portions (bearing slide portions 11 and 12) of the throttle shaft 3 can be also supported in the shaft slide holes 21 and 22 of the bearings 6 and 7 to be slideable in a reciprocating direction (stroke direction).

Moreover, in the above-described embodiment, the rotary valve of butterfly type is used as the throttle valve 4. However, a valve of door type, a valve of poppet type, a valve of spool type or the like can be also used as the throttle valve 4.

Such changes and modifications are to be understood as being in the scope of the present invention as defined by the appended claims.

What is claimed is:

1. A valve device for an internal combustion engine, comprising:
    a housing which defines an air passage communicating with a cylinder of the internal combustion engine;
    a valve which is rotatably accommodated in the air passage; a shaft which holds the valve; and
    two bearing members which respectively slideably support two axial end portions of the shaft, wherein
    at least one of the valve and the shaft has two diameter-enlarged portions and two taper portions,
    the two diameter-enlarged portions being respectively arranged at two axial end portions thereof with respect to an axially intermediate portion thereof, the two axial end portions being respectively disposed at sides of the bearing members, the diameter-enlarged portion having a larger outer diameter than that of the axially intermediate portion,
    each of the two taper portions having an outer diameter which gradually increases from a side of the axially intermediate portion toward a side of the diameter-enlarged portion.

2. The valve device according to claim 1, wherein:
    the valve includes a plate-shaped portion which has a plate thickness smaller than the outer diameter of the shaft, and two flange portions which are integrated with the plate-shaped portion and respectively continuously surround the shaft of the sides of the bearing members to respectively closely contact outer surfaces of the sides of the bearing members of the shaft;
    the diameter-enlarged portions are constructed of the flange portions.

3. The valve device according to claim 2, wherein:
    each of the bearing members has a slide hole, in which the axially end portion of the shaft is supported slideably in a rotation direction of the shaft;
    the housing includes a cylindrical portion having a cavity with a circular-shaped cross section and two penetration holes, which are substantially concentric with the slide holes of the bearing members and through which the two axial end portions of the shaft respectively penetrate; and
    the outer diameter of the flange portion is larger than an inner diameter of the slide hole and an inner diameter of the penetration hole,
    each of the flange portions having an annular bearing-side end surface, which faces an inner surface of the cylindrical portion and overlaps the inner surface in a radius direction of the flange portion.

4. The valve device according to claim 1, wherein:
    the shaft includes a minimum outer diameter portion which is arranged at the axially intermediate portion, and two maximum outer diameter portions which are respectively arranged at sides of the two axial ends of the shaft;
    the minimum outer diameter portion functions as a valve holding portion which fixedly holds the valve; and
    the maximum outer diameter portions function as the diameter-enlarged portions and bearing slide portions which rotatably slide in the bearing members.

5. The valve device according to claim 1, wherein:
    the housing is a throttle body which has therein a suction passage having a circular-shaped cross section, the suction passage being communicated with the cylinder of the internal combustion engine;
    the valve is a throttle valve, which is accommodated in the suction passage and openable and closable therein; and
    the shaft is a throttle shaft which penetrates through the suction passage in a diametric direction of the suction passage, the axial end portions of the shaft being rotatably supported by the throttle body through the bearing members.

6. The valve device according to claim 1, wherein the valve is constructed of one of a rotary valve of butterfly, a valve of door type, a valve of poppet type, and a valve of spool type.

7. The valve device according to claim 3, wherein the plate-shaped portion of the valve has a circular shape and includes two disc portions each of which has a semicircular plate shape, an outer periphery of the disc portion having a shape conforming to that of an inner surface of the cylindrical portion.

8. The valve device according to claim 7, wherein:
    the valve is made of a resin and integrally molded by an injection molding, in which the inner surface of the cylindrical portion held in an injection-molding die is used as a part of the injection-molding die for molding the outer peripheries of the disc portions of the valve and the annular bearing-side end surfaces of the flange portions.

9. The valve device according to claim 1, wherein:
    the two taper portions, each of which has a truncated conical cylindrical shape, are respectively positioned between the axially intermediate portion and the two diameter-enlarged portions.

* * * * *